(12) United States Patent
Eversole et al.

(10) Patent No.: US 11,479,029 B2
(45) Date of Patent: Oct. 25, 2022

(54) PAPER LABEL WITH POLYMER FILM REINFORCEMENT AND METHOD OF MANUFACTURE

(71) Applicant: Mar-Co Packaging, Inc., Benton Harbor, MI (US)

(72) Inventors: Thomas P. Eversole, Saint Joseph, MI (US); Charles Eversole, South Haven, MI (US); Walter R. Fish, Stevensville, MI (US)

(73) Assignee: MAR-CO PACKAGING, INC., Benton Harbor, MI (US)

(*) Notice: Subject to any disclaimer, the term of this patent is extended or adjusted under 35 U.S.C. 154(b) by 328 days.

(21) Appl. No.: 16/797,591

(22) Filed: Feb. 21, 2020

(65) Prior Publication Data

US 2021/0260860 A1 Aug. 26, 2021

(51) Int. Cl.

| | |
|---|---|
| B32B 37/00 | (2006.01) |
| B32B 27/00 | (2006.01) |
| B32B 7/00 | (2019.01) |
| B32B 38/00 | (2006.01) |
| B32B 37/12 | (2006.01) |
| B32B 27/10 | (2006.01) |
| B32B 7/14 | (2006.01) |
| B32B 37/14 | (2006.01) |
| B32B 37/24 | (2006.01) |
| B32B 37/26 | (2006.01) |

(52) U.S. Cl.
CPC ............ *B32B 37/1292* (2013.01); *B32B 7/14* (2013.01); *B32B 27/10* (2013.01); *B32B 37/0053* (2013.01); *B32B 37/142* (2013.01); *B32B 37/24* (2013.01); *B32B 37/26* (2013.01); *B32B 38/0004* (2013.01); *B32B 37/12* (2013.01); *B32B 2037/243* (2013.01); *B32B 2037/268* (2013.01); *B32B 2307/412* (2013.01); *B32B 2519/00* (2013.01)

(58) Field of Classification Search
None
See application file for complete search history.

(56) References Cited

U.S. PATENT DOCUMENTS

| | | | | |
|---|---|---|---|---|
| 2,304,787 | A * | 12/1942 | Stanton | ................ B31D 1/021 |
| | | | | 428/40.1 |
| 5,593,749 | A * | 1/1997 | Instance | ............... G09F 3/0289 |
| | | | | 156/290 |
| 5,722,538 | A * | 3/1998 | Neely | ...................... G09F 3/02 |
| | | | | 283/79 |

(Continued)

*Primary Examiner* — Linda L Gray
(74) *Attorney, Agent, or Firm* — Botkin & Hall, LLP

(57) ABSTRACT

A method for manufacturing a roll of stock material for making a label having a shelf portion with pressure sensitive adhesive and a bib portion with deadened adhesive is provided. The shelf portion includes a layer of polymer. A continuous layer of paper is bonded to a continuous layer of polymer with applied strips of catalyzed adhesive from a roller. Unbonded strips of polymer are kiss-cut and removed to expose the paper between bonded strips of polymer. A continuous layer of pressure sensitive adhesive is applied over the polymer and exposed paper. Strips of deadening agent are applied over the layer of pressure sensitive adhesive that overlays the exposed paper. The pressure sensitive adhesive and deadening agent are cured and a release layer is applied over them.

17 Claims, 6 Drawing Sheets

(56) References Cited

U.S. PATENT DOCUMENTS

| | | | |
|---|---|---|---|
| 5,902,439 A * | 5/1999 | Pike | G09F 3/10 |
| | | | 156/267 |
| 6,364,990 B1 * | 4/2002 | Grosskopf | B65D 23/003 |
| | | | 283/105 |
| 2006/0260743 A1 * | 11/2006 | Crum | B31D 1/021 |
| | | | 156/291 |
| 2016/0031670 A1 * | 2/2016 | Ishii | B32B 37/18 |
| | | | 156/367 |
| 2016/0133166 A1 * | 5/2016 | Dobler | B32B 7/12 |
| | | | 428/34.1 |

* cited by examiner

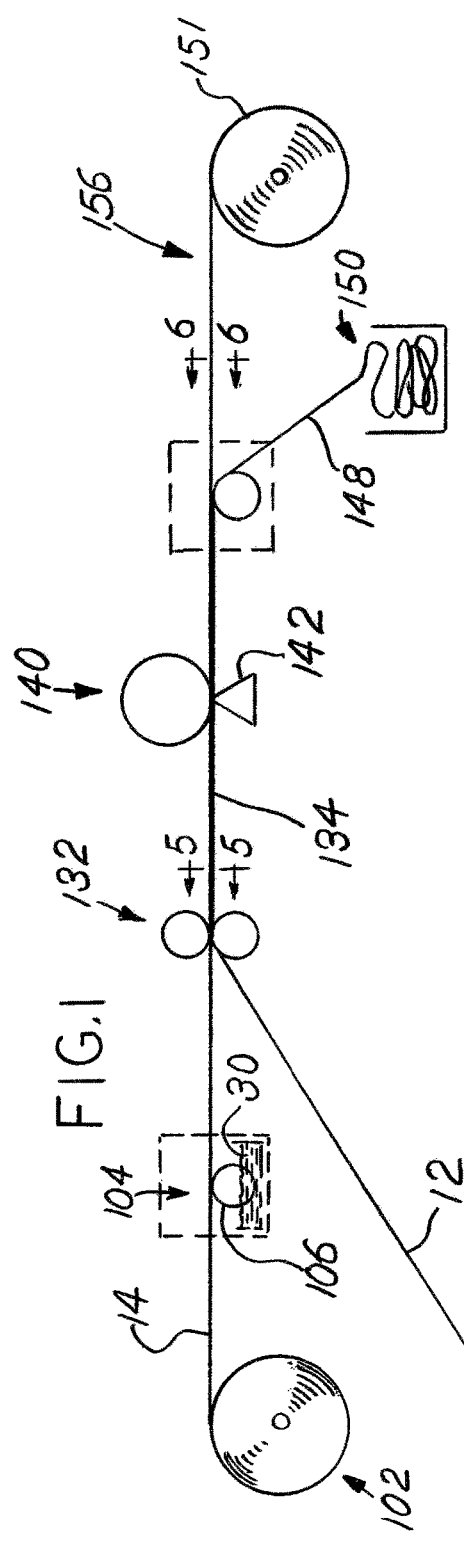
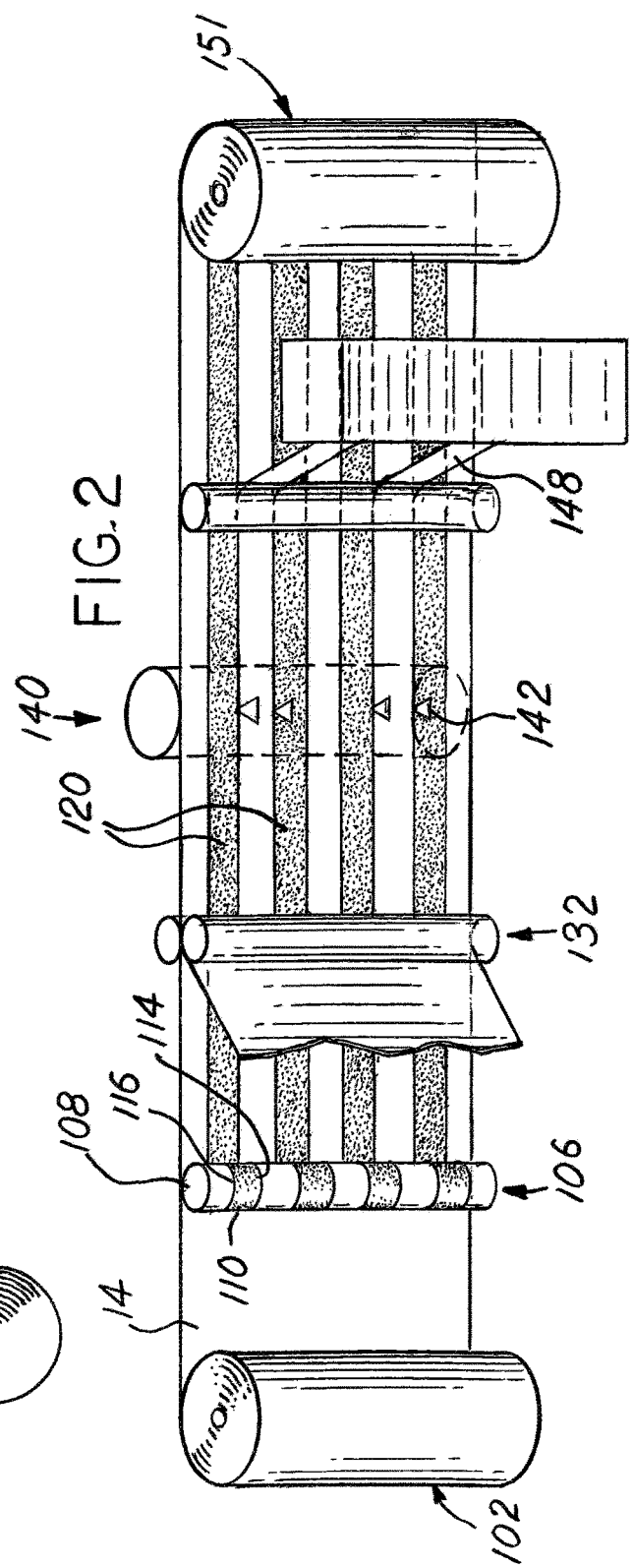

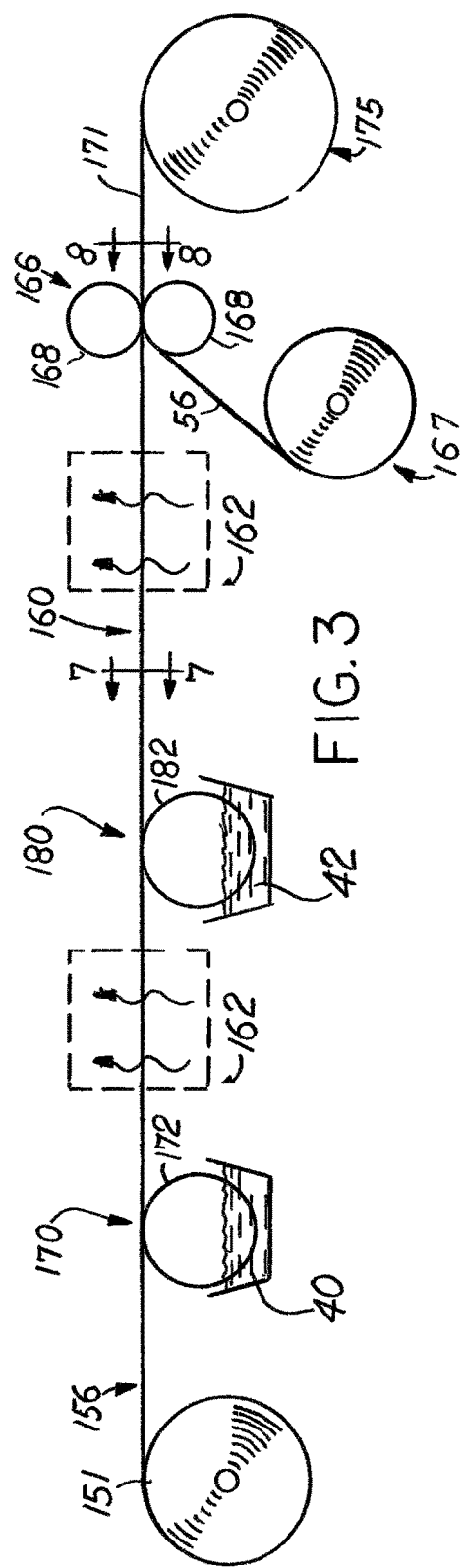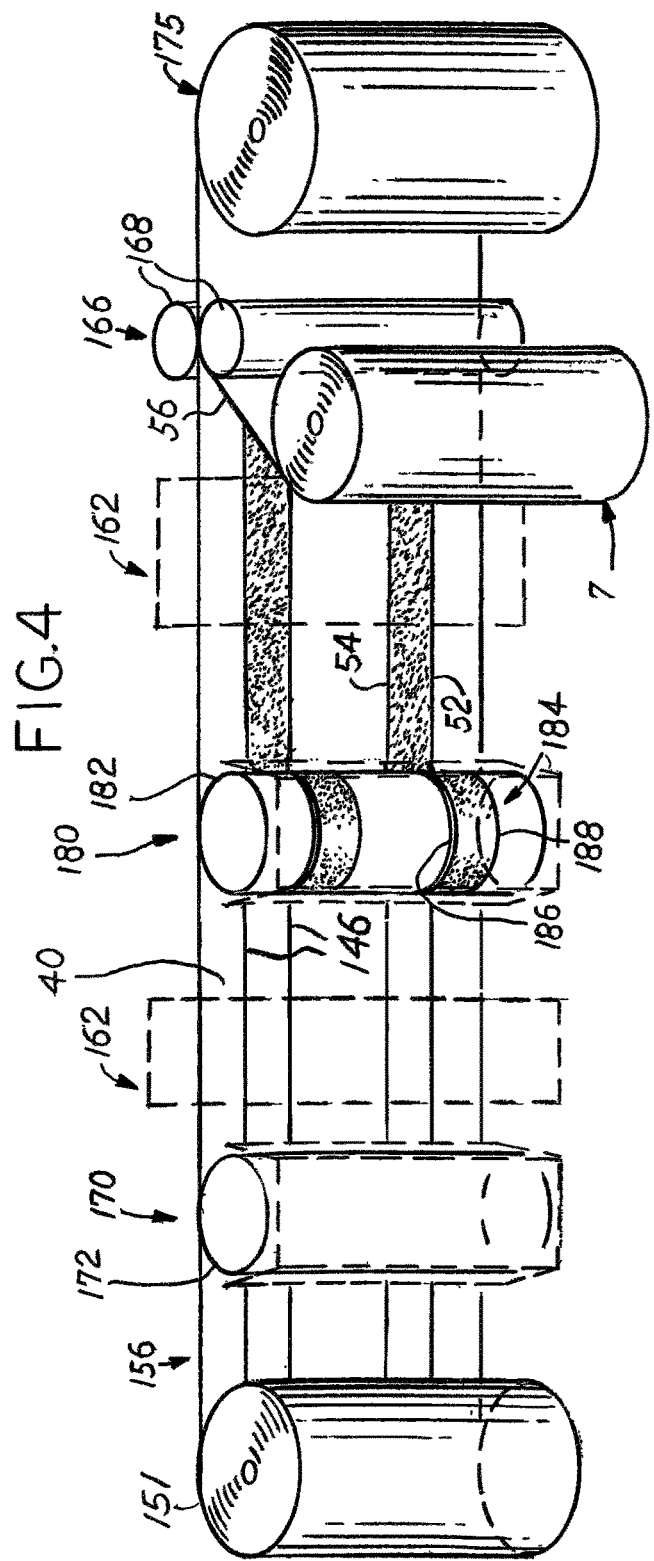

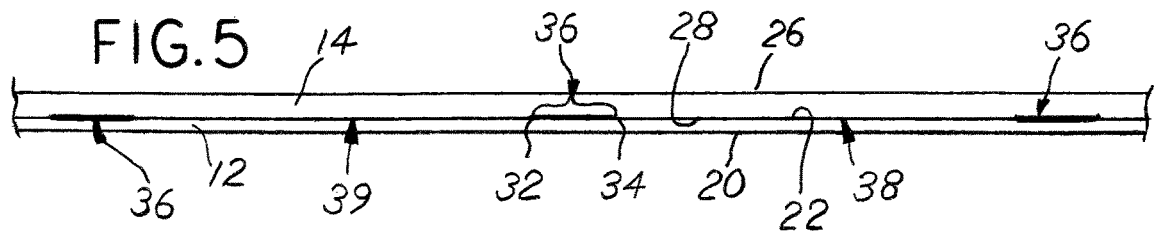
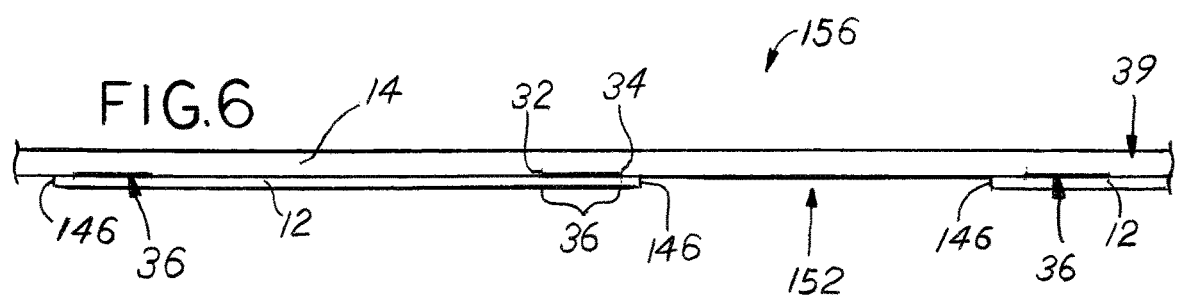
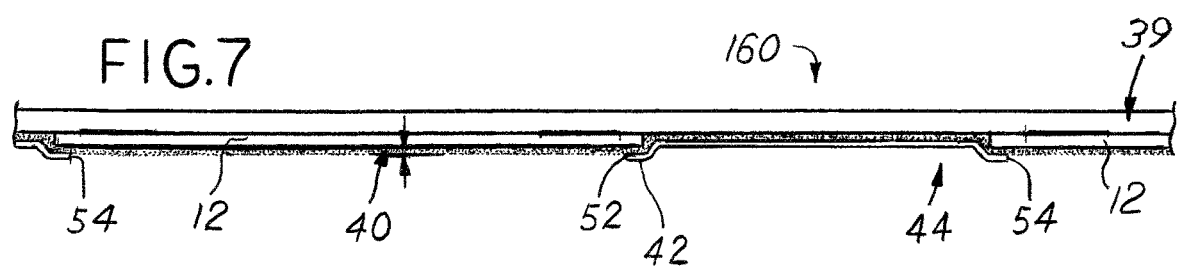
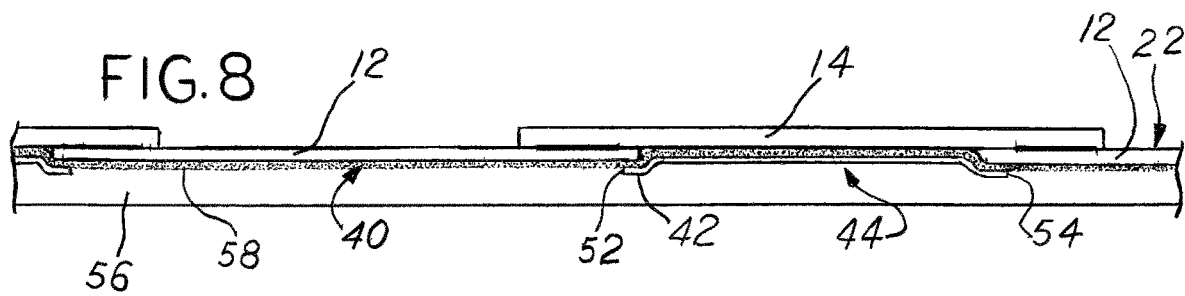

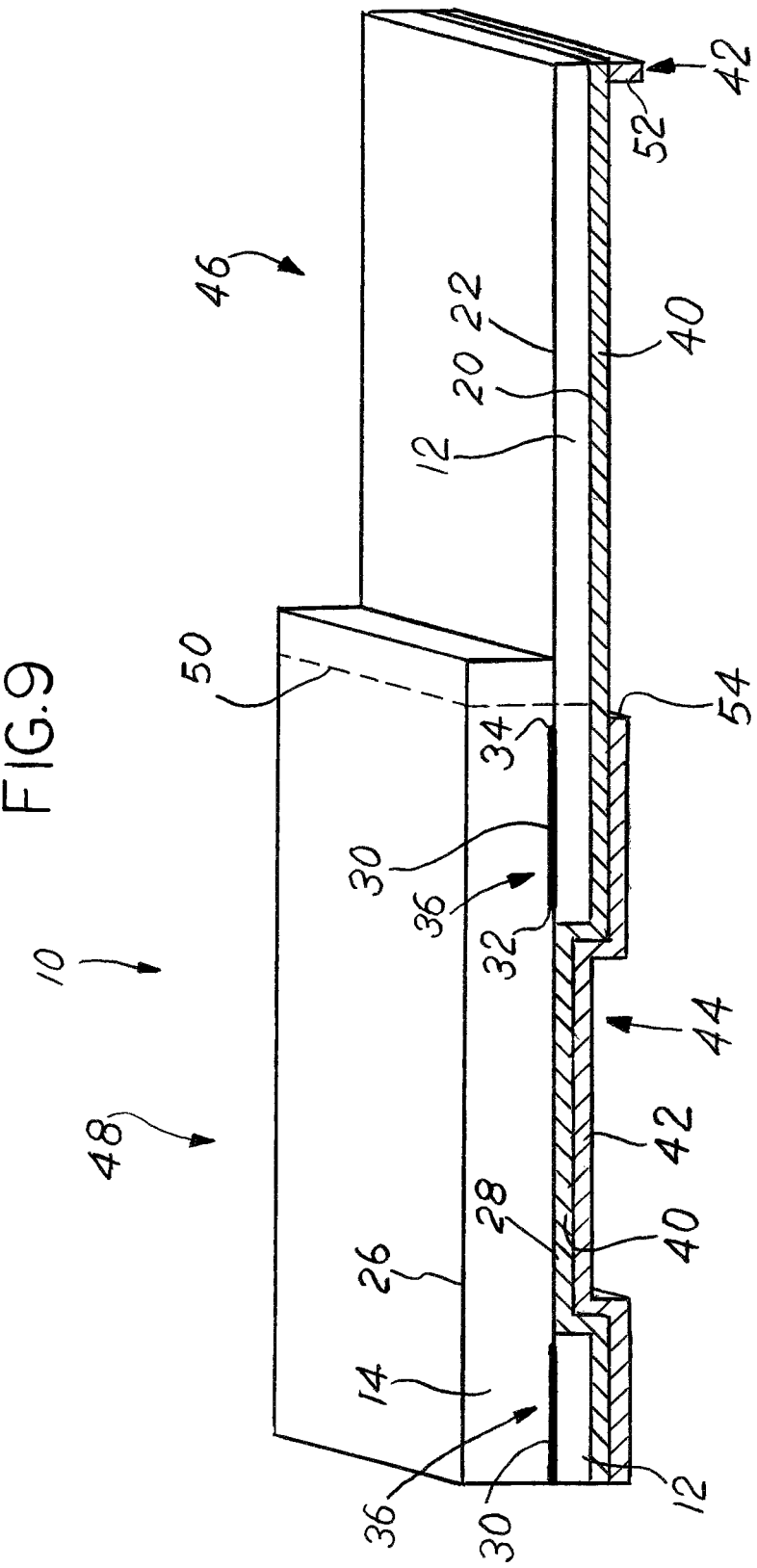

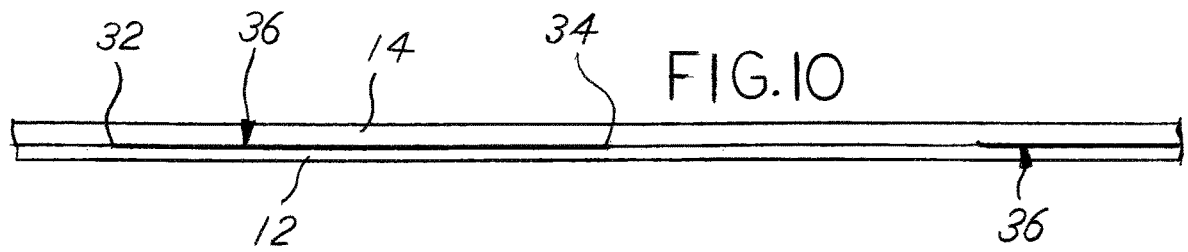
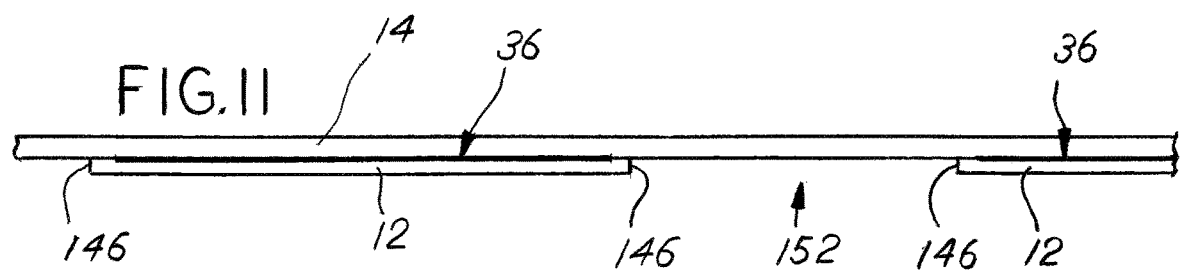
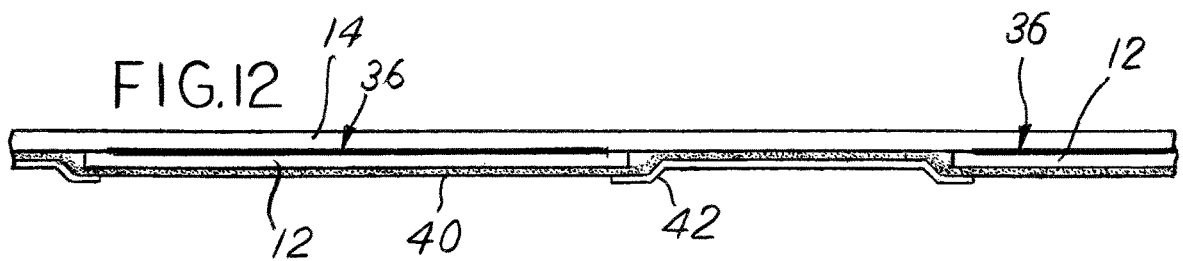
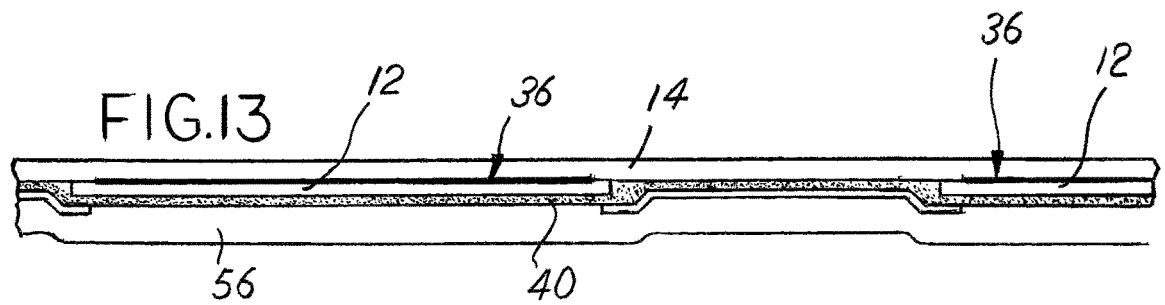

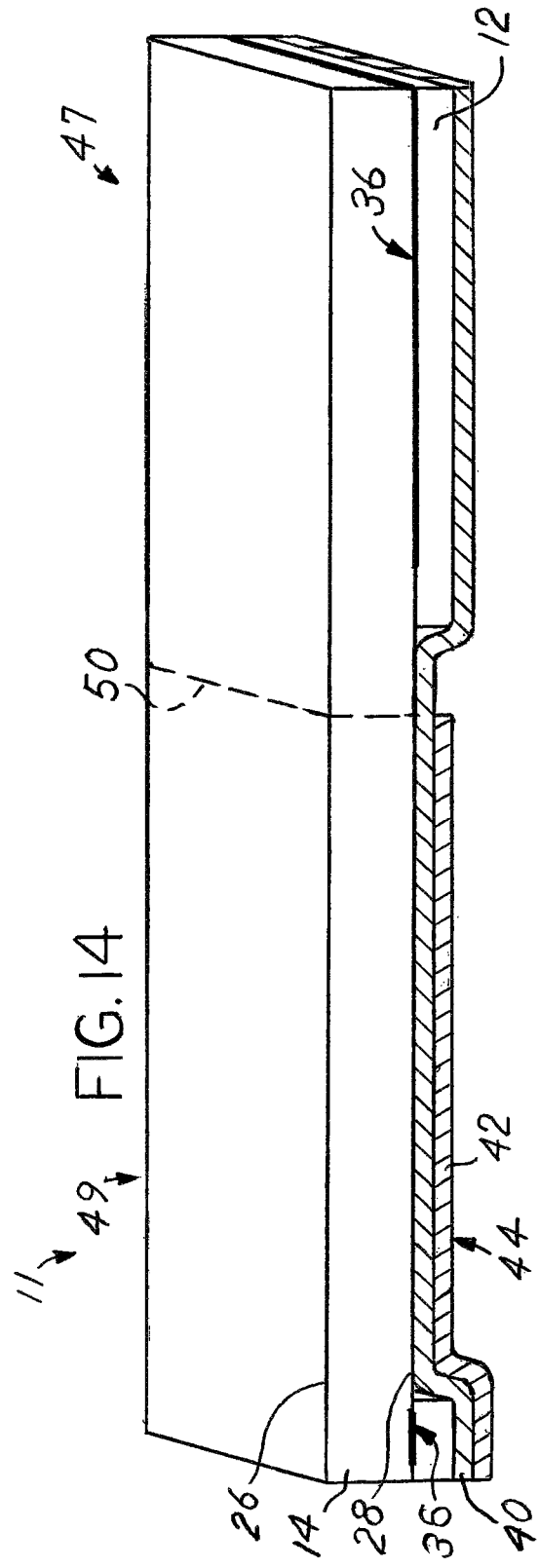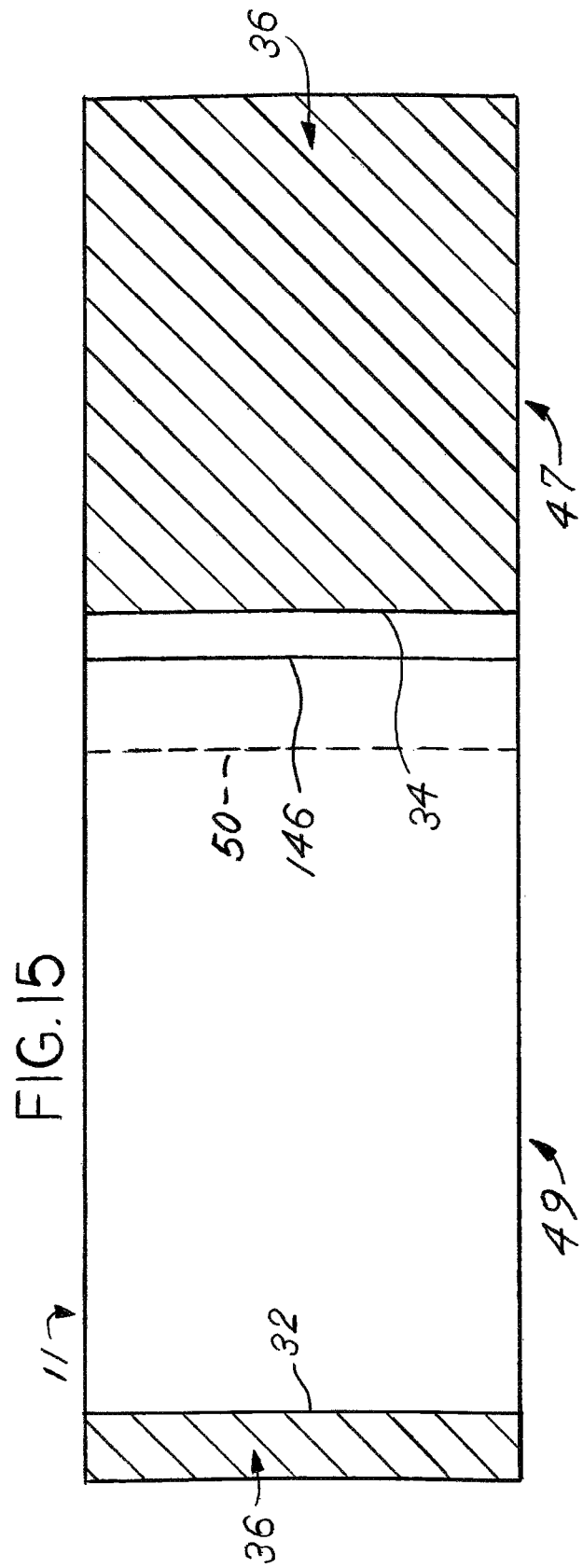

PAPER LABEL WITH POLYMER FILM REINFORCEMENT AND METHOD OF MANUFACTURE

BACKGROUND OF THE INVENTION

This present disclosure relates to the manufacture of stock material for adhesive labels with polymer film. It is desirable to have polymer film reinforced labels for product identification, pricing, promotions, or other identification or inventory purposes. Paper labels are easy to write or print on, but can be easily torn, leaving portions of adhesive-backed material that is unsightly and time-consuming to remove. Polymer labels can be difficult to print or write on. Adding polymer reinforcement provides the benefits of paper labels with the tear resistance of polymer. However, existing labels with polymer reinforcement are fully laminated. These curl with temperature and humidity differences. For example, when the label is used in a refrigerated environment, the dissimilar thermal expansion and moisture absorption of the laminated materials results in the label curling. This makes it difficult or impossible to read, defeating the purpose of the label. Other attempts to solve this problem use a vinyl reinforcement layer, which does not curl the same as poly but contains environmentally harmful chemicals and is not capable of being recycled. An improved label and process are needed.

SUMMARY OF THE INVENTION

The present disclosure describes a process for manufacturing a polymer reinforced stock material for making a label with a shelf portion that is tacky and a bib portion that is significantly less tacky or not tacky at all. The shelf portion is reinforced with poly and the bib portion is paper. The polymer reinforced label is manufactured by permanently bonding a continuous roll of poly to a continuous roll of paper in bands, leaving un-bonded areas between the bonded areas. The poly is kiss-cut in the un-bonded areas adjacent the bonded areas to separate it from the bonded sheets. Removing the poly in the un-bonded areas exposes strips of paper adjacent the bonded areas. Next, a continuous layer of pressure sensitive adhesive (PSA) is applied over the poly and exposed paper. After the PSA is applied, continuous strips of kill or deadening agent are selectively applied over the PSA to make an area that will become the bib portion. The bib portion has a slight tackiness to allow it to remain on the silicone liner for processing and printing. Another embodiment is a polymer reinforced label with a transparent shelf portion, a second un-bonded area is formed parallel and adjacent the bonded area. After the PSA and kill are applied, the paper is kiss-cut in the second un-bonded area adjacent the bonded area and the paper is removed.

BRIEF DESCRIPTION OF THE DRAWINGS

FIG. 1 is a simplified side view of the bonding process;
FIG. 2 is a bottom isometric view of the bonding process as shown in FIG. 1;
FIG. 3 is a simplified side view of the adhesive process;
FIG. 4 is a bottom isometric view of the adhesive process as shown in FIG. 3;
FIG. 5 is a section view 5-5 of the bonded material as shown in FIG. 1;
FIG. 6 is a section view 6-6 of the stripped material as shown in FIG. 1;
FIG. 7 is a section view 7-7 of the PSA applied material as shown in FIG. 3;
FIG. 8 is a section view 8-8 of the face paper stripped material as shown in FIG. 3;
FIG. 9 is an isometric view of a finished label; and
FIG. 10 is a section view 5-5 of the bonded material as shown in FIG. 1 for the full paper label;
FIG. 11 is a section view 6-6 of the stripped material as shown in FIG. 1 for the full paper label;
FIG. 12 is a section view 7-7 of the PSA applied material as shown in FIG. 3 for the full paper label;
FIG. 13 is a section view 8-8 of the face paper stripped material as shown in FIG. 3 for the full paper label;
FIG. 14 is an isometric view of a finished label with full paper; and
FIG. 15 is a view of the label in FIG. 14 from the adhesive and killed side.

DESCRIPTION OF THE PREFERRED EMBODIMENT

A process for generating stock for making a label 10, 11 is described herein, where the label 10, 11 is formed from a roll or sheet of polymer film 12 and a roll or sheet of face paper 14. An individual label is shown in FIGS. 9 and 14 with process steps shown in FIGS. 1-8 and 10-13. The polymer film 12 is commonly transparent and has a PSA side 20 and an oppositely located bonding side 22. The sides 20, 22 of the film 12 as described herein are for identification with no physical or structural differences between them. Likewise, the face paper 14 has a printing side 26 and an oppositely located bonding side 28. The printing side 26 is used to display pricing information, sales, and other information to be viewed by the customer. The printing side 26 can receive printing by an end user, subsequent processing step, or other process. As with the polymer film 12, the sides 26, 28 of the face paper 14 are for identification, non-limiting, and do not specify differences. A catalyzed adhesive 30 bonds the bonding side 28 of the paper 14 to the bonding side 22 of the polymer film 12. The catalyzed adhesive 30 is a two-part cured adhesive that permanently bonds the paper 14 to the film 12. As cured, the adhesive 30 has edges 32, 34 that define the width of the bonded area 36.

As shown in FIGS. 9 and 14, the completed label 10, 11 has a layer of pressure sensitive adhesive (PSA) 40 with areas that are killed 44. The killed areas 44 make the PSA significantly less sticky and have boundary edges 52, 54. The label 10 has two portions, an attached portion 46 and a bib portion 48. The bib portion 48, as shown, is face paper 14 and does not include a layer of film 12. The bib portion 48 has a majority of the killed area 44, with the exposed and tacky PSA on the attached portion 46. The bib 48 and attached 46 portions may include a perforation 50 that allows the user to tear off the bib 48 while leaving the attached portion 46 after a promotion, sale, or other event is over. The process described herein is used to make at least two different versions of the label, with label 10 shown in FIG. 9 and label 11 shown in FIG. 10. The label 11 has face paper 14 and polymer film 12 the same as label 10, but the polymer film 12 is used as a reinforcement layer and remains covered by the face paper 14. The label 11, similar to label 10, has an attached portion 47 and a bib portion 49. It uses the same catalyzed adhesive 30 to make the bonded area 36 with edges 32, 34. The label 10, 11 is carried on a release liner 56 with a release surface 58 that allows the label 10, 11 to be cleanly removed for placing on a shelf edge (not shown). The release liner 56 preserves the PSA 40 and allows the label 10 to be handled, processed, printed, and transported easily.

The process 100 starts by unwinding 102 the face paper 14 and applying bands of catalyzed adhesive 30 to the face paper 14, as shown in FIGS. 1 and 2. This occurs in the application station 104 where the face paper 14 passes over a band applicator 106. To add clarity to the FIGS., the machine direction is from the left side of FIGS. 1 and 2 to the right side. The band applicator 106 is an elongate cylinder 108 with rings 110 that hold and apply the liquid adhesive. The rings 110 have a width defined by edges 114, 116. The rings 110 apply continuous strips 120 of adhesive 30 to the face paper 14 along the length and in the machine direction. While shown being applied to the face paper 14, it is contemplated that the continuous strips 120 are applied to the polymer film 12. The adhesive 30 is a 100% solids catalyzed (two-part) urethane adhesive that allows tight control of edges that correspond to the defined edges 32, 34 of the bonded area 36. For tight edge control and processing, catalyzed adhesive is superior to a solvent-based adhesive that requires evaporation. Evaporation causes shrinkage, which requires the application of excessive material to compensate for the shrinkage. Applying additional material results in more difficult edge control. Next, the polymer film 12 is unwound at an unwinder 130 and applied to the face paper 14 at an application station 132. The application occurs before the adhesive 30 cures, which permanently bonds the polymer film 12 to the face paper 14 where the strips 120 of adhesive 30 were placed. This forms the bonded area 36. Adjacent the bonded area 36 is a first non-bonded area 38 and a second non-bonded area 39, shown in FIG. 5. The non-bonded areas 38, 39 are also referred to as pillows. They are long strips where the film 12 and paper 14 are held in close proximity or directly against each other but they are not attached or bonded to each other. The second non-bonded area 39 is unique to the label 10 design, which allows subsequent removal of a portion of the face paper 14. The non-bonded areas 38, 39 are between the bonded areas 36. A section view of the bonded paper 14 and poly 12 is shown in FIG. 5. Between the continuous strips 120, the non-bonded areas 38, 39 show the face paper 14 and polymer film 12 overlaying each other. At this point, the bonded film and paper 134 can be wound for storage, transportation, or movement to a subsequent machine or process, as shown in FIGS. 1 and 2 with the take up spool 151. It is contemplated that the bonded film and paper 134 proceed immediately to the next step in the process without being wound up on the take up spool 151.

The next step in the process 100 involves kiss-cutting 140 the bonded film and paper 134 through the polymer film 12. First, the take up spool 151 is transferred to the process as shown in FIGS. 3 and 4. As with FIGS. 1 and 2, FIGS. 3 and 4 show the machine direction from the left side to the right side of the images. The kiss-cutting 140 occurs with precision knives 142 that are adjusted to cut only through the polymer film 12. The kiss-cuts 144 are in the first non-bonded area 38 and adjacent the edges 32, 34 of the bonded area 36. Tight edge control of the bonded area 36 is critical to the location of the kiss cuts 144. The kiss cut 144 needs to be close to the edges 32, 34 without extending into the bonded area 36. Extending into the bonded area would result in torn face paper 14 and ragged edges. If the kiss cut 144 is too far away from its corresponding edge 32, 34, the poly that is beyond the edge 34 is unattached and could become caught in processing equipment or be unsightly in the finished label 10. The kiss-cuts 144 create kiss-cut edges 146, shown in FIG. 6. The kiss-cuts 144 also create poly scrap 148 between the kiss-cut edges 146 that is removed at a scrap winding station 150. After removing the poly scrap 148, there are exposed areas of paper 152 adjacent bonded areas of poly 154. This forms a continuous sheet of paper with stripped poly 156, shown in FIG. 6. The bonding side 28 in the exposed areas 152 and the PSA side 20 of the poly 12 are exposed.

Next, the paper with stripped poly 156 gets a complete layer of PSA 40 across the exposed areas 152 and PSA side 20 in the PSA station 170. The PSA station 170 has a continuous supply of liquid PSA 40 that is applied with a roller 172. After the PSA 40 is applied, a kill station 180 selectively applies kill 42 with a roller 182. The roller 182 has a continuous supply of liquid kill 42, but due to the geometry of the roller 182, the kill 42 is only applied in select areas. The roller 182 has bands 184 with edges 186, 188 that define the boundaries and edges 52, 54 of the killed area 44. It is contemplated that the roller 182 has additional features that apply kill 42 in other patterns. After the PSA 40 and kill 42 are applied, the material 160 proceeds to the curing station 162, where the PSA 40 and kill 42 are cured. This is commonly an oven with infrared heat, but other types of curing are contemplated. Next, the release liner 56 is unwound 167 and applied to the material 160 and passed through a liner application station 166 with rollers 168 that apply the liner 56 to the material 160. At this point, the label stock 171 is rolled up 175 for storage or transport.

For the label design 10, post processing of the label stock 171 may continue. For the label 10 shown in FIG. 9, the face paper 14 is not bonded to the poly 12 in the second non-bonded area 39. A kiss cut through the face paper 14 in the second non-bonded area 39 adjacent the edges 32, 34 of the bonded area 36. This allows the face paper 14 to be subsequently removed, exposing the bonding side 22 of the polymer film 12, shown in FIG. 8, and creating the label 10 as shown in FIG. 9. Once the face paper 14 is removed as shown in FIG. 8, the section of the label stock is alternating bands of polymer film 12 and face paper 14 that are bonded where they overlap with the catalyzed adhesive 30. For label design 11, there is no second non-bonded area 39, with the bonded area 36 being much wider, shown in FIGS. 11-13.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A method of manufacturing a hybrid adhesive laminated stock comprising the steps:
   providing a continuous roll of polymer having a pressure sensitive adhesive side and an opposite bonding side,
   providing a continuous roll of face paper having a printing side and an opposite bonding side;
   providing a striped roller with rings, applying catalyzed adhesive from said rings on said striped roller in continuous parallel stripes in a machine direction on said bonding side of said face paper;
   permanently bonding said bonding side of said polymer to said bonding side of said face paper where said parallel stripes of said catalyzed adhesive are applied and forming continuous parallel bonded stripes having defined edges to define a boundary between said parallel bonded stripes and continuous non-bonded pillow stripes;
kiss cutting through said polymer in said non-bonded pillow stripes adjacent one of said defined edges of one of said parallel bonded stripes;
stripping said polymer from said non-bonded pillow stripes and exposing parallel areas of said bonding side of said face paper, said exposed parallel areas located between said bonded stripes;
applying a continuous layer of pressure sensitive adhesive over said bonded stripes and said exposed parallel areas located therebetween; and
applying continuous parallel stripes of kill over said continuous layer of pressure sensitive adhesive that directly contact said bonding side of said face paper.

2. The method as claimed in claim 1, further comprising kiss cutting through said face paper between said bonded stripes, removing said face paper over a second non-bonded area.

3. The method as claimed in claim 2, wherein said laminated stock is alternating bands of said polymer and said face paper adhered by said catalyzed adhesive.

4. The method as claimed in claim 1, wherein said parallel stripes of kill not extending over another of said bonded stripes of said polymer.

5. The method as claimed in claim 1, wherein said polymer is transparent film.

6. The method as claimed in claim 1, wherein said parallel stripes of kill partially extending over one of said bonded stripes of said polymer.

7. The method as claimed in claim 1, further comprising applying a release liner over said pressure sensitive adhesive and said kill.

8. A method of manufacturing a hybrid adhesive label stock comprising the steps:
providing a continuous roll of polymer having a pressure sensitive adhesive side and an opposite bonding side,
providing a continuous roll of face paper having a printing side and an opposite bonding side;
providing a striped roller with rings, applying catalyzed adhesive from said rings in continuous parallel stripes in a machine direction on said bonding side of said face paper;
permanently bonding said bonding side of said polymer to said bonding side of said face paper where said parallel stripes of said catalyzed adhesive are applied and forming continuous parallel bonded stripes adjacent continuously non-bonded pillow stripes;
kiss cutting through said polymer in said non-bonded pillow stripes adjacent an edge of one of said continuous parallel bonded stripes;
stripping said polymer from said non-bonded pillow stripe and exposing parallel areas of said bonding side of said face paper, said exposed parallel areas of said bonding side located between said bonded stripes;
applying a continuous layer of pressure sensitive adhesive over said bonded stripes and said exposed parallel areas located therebetween; and
applying continuous parallel stripes of kill over said continuous layer of pressure sensitive adhesive directly contacting said bonding side of said face paper.

9. The method as claimed in claim 8, further comprising kiss cutting through said face paper between said bonded stripes, removing said face paper over a second non-bonded area.

10. The method as claimed in claim 9, wherein a laminated stock is alternating bands of said polymer and said face paper adhered by said catalyzed adhesive.

11. The method as claimed in claim 8, wherein said polymer is transparent film.

12. The method as claimed in claim 8, further comprising applying a release liner over said pressure sensitive adhesive and said kill.

13. A method of manufacturing a hybrid adhesive label having a paper bib area and a polymer reinforced adhesive area, said method comprising the steps:
providing a continuous roll of polymer having a pressure sensitive adhesive side and an opposite bonding side,
providing a continuous roll of face paper having a printing side and an opposite bonding side;
providing a striped roller, applying catalyzed adhesive from said striped roller in continuous parallel stripes on said bonding side of said face paper;
bonding said bonding side of said polymer to said bonding side of said face paper where said parallel stripes of said catalyzed adhesive are applied and forming continuous parallel bonded stripes adjacent continuously non-bonded pillow stripes;
kiss cutting through said polymer in said non-bonded pillow stripes adjacent an edge of one of said bonded stripes; and
removing said polymer from said non-bonded stripe and exposing parallel areas of said bonding side of said face paper, said exposed parallel areas located between said bonded stripes.

14. The method as claimed in claim 13, further comprising the step of applying a continuous layer of pressure sensitive adhesive over said bonded stripes and said exposed parallel areas located therebetween.

15. The method as claimed in claim 14, further comprising the step of applying continuous parallel stripes of kill over said continuous layer of pressure sensitive adhesive on said exposed parallel areas of said face paper, said parallel stripes of kill partially extending over said bonded stripes of said polymer.

16. The method as claimed in claim 13, further comprising kiss cutting through said face paper between said bonded stripes, removing said face paper over a second non-bonded area.

17. The method as claimed in claim 16, wherein a laminated stock is alternating bands of said polymer and said face paper adhered by said catalyzed adhesive.

* * * * *